(12) United States Patent
Bae

(10) Patent No.: US 7,671,157 B2
(45) Date of Patent: Mar. 2, 2010

(54) MODIFICATION OF POLYMERS HAVING AROMATIC GROUPS THROUGH FORMATION OF BORONIC ESTER GROUPS

(75) Inventor: Chulsung Bae, Las Vegas, NV (US)

(73) Assignee: Board of Regents of the Nevada System of Higher Education on Behalf of the University of Nevada, Las Vegas, Las Vegas, NV (US)

( * ) Notice: Subject to any disclaimer, the term of this patent is extended or adjusted under 35 U.S.C. 154(b) by 0 days.

(21) Appl. No.: 12/080,372

(22) Filed: Apr. 2, 2008

(65) Prior Publication Data

US 2008/0262163 A1 Oct. 23, 2008

Related U.S. Application Data

(60) Provisional application No. 60/921,459, filed on Apr. 2, 2007.

(51) Int. Cl.
*C08F 212/04* (2006.01)
(52) U.S. Cl. .............................. 526/346; 525/389; 528/8
(58) Field of Classification Search ................ 525/535, 525/389; 526/346; 528/8
See application file for complete search history.

(56) References Cited

U.S. PATENT DOCUMENTS

| | | | |
|---|---|---|---|
| 3,030,346 A | 4/1962 | Cooper, Jr. | 526/73 |
| 3,231,635 A | 1/1966 | Holden et al. | 525/271 |
| 3,652,516 A | 3/1972 | Farrar | 526/173 |
| 4,096,203 A | 6/1978 | St. Clair | 524/505 |
| 4,200,718 A | 4/1980 | Tung et al. | 526/173 |
| 4,201,729 A | 5/1980 | Tung et al. | 260/665 R |
| 4,205,016 A | 5/1980 | Tung et al. | 260/665 R |
| 4,845,173 A | 7/1989 | Yoshida et al. | 525/272 |
| 2003/0220520 A1* | 11/2003 | Marcuccio et al. | 562/7 |
| 2005/0148775 A1 | 7/2005 | Miyaura et al. | 546/13 |

OTHER PUBLICATIONS

S. Liu, A. Sen, *Macromolecules* 2000, 33, 5106.
Y. Gao, S. Li, H. Li, X. Wang, *Eur. Polym. J.* 2005, 41, 2329.
E. B. Orler, D. J. Yontz, R. B. Moore, *Macromolecules* 1993, 26, 5157.
H.-M. Li, J.-C. Liu, F.-M. Zhu, S.-A. Lin, *Polym. Int.* 2001, 50, 421.
E. B. Orler, R. B. Moore, *Macromolecules* 1994, 27, 4774.
J. Y. Dong, E. Manias, T. C. Chung, *Macromolecules* 2002, 35, 3439.
K. H. Kim, W. H. Jo, S. Kwak, K. U. Kim, J. Kim, *Macromol. Rapid Commun.* 1999, 20,175.
P. Rocca et al., J. Org. Chem., 58, 7832, 1993.
K. Kamiyama, T. Watanabe, M. Uemura, J. Org. Chem., 61, 1375 (1996).
Shimada, S., Batsanov, A. S., Howard, J. A. K, Marder, T. B., Angew. Chem. Int. Ed., 40, 2168 (2001)).
Tse, M. K., Cho, J. Y., Smith, M. R., III. Org. Lett., 3, 2831 (2001).
Cho, J. Y., Iverson, C. N., Smith, M. R., III. J. Am. Chem. Soc., 122, 12868 (2000).
Chen, H., Hartwig, J. F., Science, 287, 1995 (2000).
Chen, H., Hartwig, J. F., Agnew. Chem. Int. Ed., 38, 3391 (1999).
Ishiyama, T., Takagi, J., Ishida, K., Miyaura, N., Anastasi, N. R., Hartwig, J. F., J. Am. Chem. Soc., 124, 390 (2002).
Cho, J. Y., Tse, M. K., Holmes, Science, 295, 305 (2002).
Iverson, C. N., Smith, M. R., III. J. Am. Chem. Soc., 121, 7696 (1999).
T. R. Hoye, M. Chen, J. Org. Chem., 61, 7940 (1996).
P. D. Hobbs et al., J. Chem. Soc. Chem. Commun., 923 (1996).
T. R. Kelly et al., Tetrahedron Lett., 35, 7621 (1994).
A. R. Martin, Y. Yang, Acta. Chem. Scand., 47, 221, 1993.

* cited by examiner

*Primary Examiner*—Randy Gulakowski
*Assistant Examiner*—Kyle Baumstein
(74) *Attorney, Agent, or Firm*—Mark A. Litman Associates, P.A.

(57) ABSTRACT

The C—H bond of pendant aromatic groups such as commercial polystyrenes with three types of tacticities (syndiotactic, isotactic, atactic) undergo catalyzed functionalization with boron reagents. A boronic ester group formed on the polymer in the polystyrene was further converted to hydroxy and arene via oxidation and coupling reactions, respectively. These functionalizations proceeded without significantly affecting the molecular weight of starting polymer and the functional concentrations could be easily controlled by changing the ratio of boron reagent to monomer unit.

15 Claims, 1 Drawing Sheet

US 7,671,157 B2

MODIFICATION OF POLYMERS HAVING AROMATIC GROUPS THROUGH FORMATION OF BORONIC ESTER GROUPS

RELATED APPLICATION DATA

This Application claims priority from U.S. Provisional Application Ser. No. 60/921,459, filed 2 Apr. 2007.

GOVERNMENT INTEREST

The present technology was developed free of any Government funding

BACKGROUND OF THE INVENTION

The present invention relates to polymers, polymer chemistry and the modification of properties of polymers by chemical reactions with the polymer.

Polyolefins are the most ubiquitous commercial polymer in the world owing to their unique chemical and physical properties, processability, and low production cost. Controlled introduction of specific functionality into nonpolar polyolefins can yield a new class of polymeric materials with enhanced abilities such as adhesion to polar surfaces. Synthesis of such a material (i.e., a functionalized polyolefin), however, remains an important challenge in polymer chemistry. Syndiotactic polystyrene (sPS) is a good example of a stereoregular polyolefin that needs further improvement. sPS exhibits intriguing properties such as a high degree of crystallinity, high melting temperature (270° C.), polymorphic phase behavior, good chemical resistance, and enhanced mechanical functioning at high temperature. Despite these physical properties, sPS has drawbacks that must be overcome if it is to have wide commercial application. These drawbacks are (a) an excessively high melt processing temperature (>300° C.) that is close to the polymer degradation temperature, (b) poor compatibility with polar materials owing to lack of functionality, and (c) poor impact strength. To address these problems, synthesis of functionalized sPS was attempted either by introducing a second monomer in copolymerization or through postfunctionalization of sPS. Unfortunately, as with other transition metal-catalyzed stereospecific olefins polymerizations, syndiospecific copolymerization of styrene with functionalized styrenes generated polymers with significantly lower molecular weights and/or lower yields compared to those afforded by styrene homopolymerization. (J K. H. Kim, W. H. Jo, S. Kwak, K. U. Kim, J. Kim, Macromol. Rapid Commun. 1999, 20, 175; J. Y. Dong, E. Manias, T. C. Chung, Macromolecules 2002, 35, 3439.).

Owing to significant progress in the development of homogeneous metallocene polymerization catalysts, a variety of polyolefins with differing tacticities and molecular weights can be conveniently accessed as starting materials. Thus, postfunctionalization of such a diverse spectrum of polyolefins is an attractive alternative approach for the synthesis of functionalized polymers with different microstructures and molecular weights. Most postfunctionalizations of polyolefin are based on a free radical-initiated reaction, however, which does not control over the molecular weight of polymer. Instead, competitive side reactions such as chain scission, chain transfer, and coupling reactions, which can alter the molecular weight and physical properties of the functionalized polymer, occur under the reaction conditions. The high melting point and high crystallinity of sPS make its controlled functionalization even more challenging. Thus homogeneous postfunctionalization of sPS is rare. So far, only a handful of examples of sPS modification using reactive carbon intermediates (radical or carbocation) under heterogeneous condition have been reported. The following references describe functionalized sPS via postfunctionalization of sPS, but not via C—H boronation of an aromatic ring. (J. Y. Dong, E. Manias, T. C. Chung, Macromolecules 2002, 35, 3439; E. B. Orler, R. B. Moore, Macromolecules 1994, 27, 4774; H.-M. Li, J.-C. Liu, F.-M. Zhu, S.-A. Lin, Polym. Int. 2001, 50, 421; E. B. Orler, D. J. Yontz, R. B. Moore, Macromolecules 1993, 26, 5157; Y. Gao, S. Li, H. Li, X. Wang, Eur. Polym. J 2005, 41, 2329; S. Liu, A. Sen, Macromolecules 2000, 33, 5106.). The homogeneous functionalization method would be the preferred route, however, because the heterogeneous methods afford less control of uniform functionalization, especially on a large scale.

Recently transition metal-catalyzed C—H activation/functionalization has emerged as a new methodology in polyolefin functionalization. Unlike traditional free radical-initiated polymer modification, this new method yielded functionalized polyolefins with negligible changes in molecular weight from the starting polymers. Unfortunately, most of these examples relied on amorphous polyolefins of relatively low molecular weight as starting polymers and required the preparation of special metal catalysts. When semicrystalline polyolefins were used for the postfunctionalization via activation of C—H bonds, their functionalization efficiencies were low because of the low turnover numbers of the catalysts. Herein, we report a highly efficient, aromatic C—H bond activation/functionalization of high-molecular-weight polystyrenes with different tacticities [syndiotactic (sPS), atactic (aPS), isotactic (iPS)] using a commercially available iridium catalyst (Scheme 1). We have found that the iridium-catalyzed borylation of aromatic C—H bonds can incorporate a high level of boronate ester group (up to 41 mol %) without disrupting the molecular weights of the parent polymers. To our knowledge, this example is the first of crystalline polyolefin functionalization that provides a high degree of functionalization without any disruption in polymer chain length (i.e., there is complete absence of chain scission or coupling of polymer chains). We also demonstrate herein that the aryl boronate ester group of sPS can serve as a versatile synthetic precursor for a range of functionalized sPS products.

SUMMARY OF THE INVENTION

The C—H bond of commercial or proprietary polymers having either pendant or backbone aromatic groups such as polystyrenes or polysulfones can undergo catalyzed (e.g., Ir-catalyzed) functionalization of with three types of tacticities (syndiotactic, isotactic, atactic) with boron reagents. The boronic ester group formed on the aromatic group on the polymer (e.g., polystyrene) can be further converted to hydroxy (OH) and functionalized arene (e.g., —$C_6H_4$-Z, where Z=silane, siloxy, halide, hydroxy, amine, carbonyl, nitrile, sulfonyl, phosphine, alkyl, alkenyl, alkynyl, aryl, reactive functionalities (e.g., ethylenically unsaturated groups, acryloyl, epoxy, and the like)) via oxidation and coupling reactions (e.g., Suzuki-Miyaura coupling), respectively. These functionalizations proceeded without significantly affecting the molecular weight of starting polymers and their functional concentrations can be easily controlled by changing the ratio of boron reagent to monomer unit.

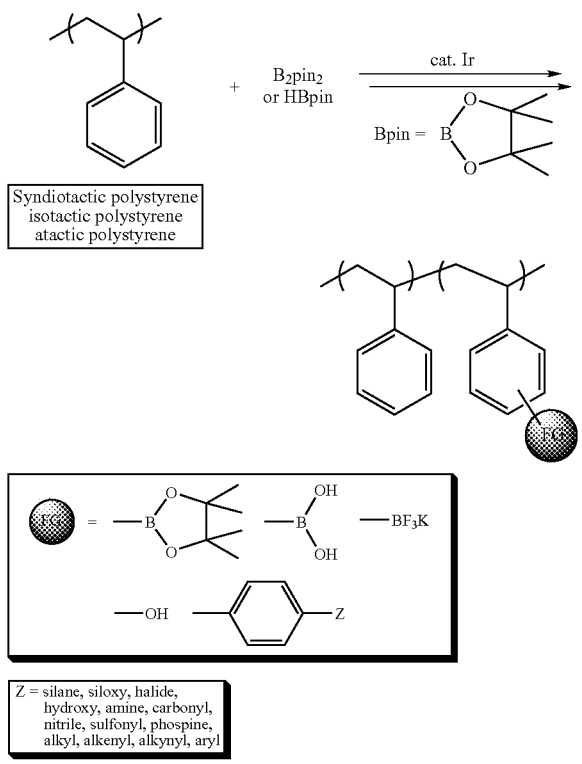

DETAILED DESCRIPTION OF THE INVENTION

Figure 1:
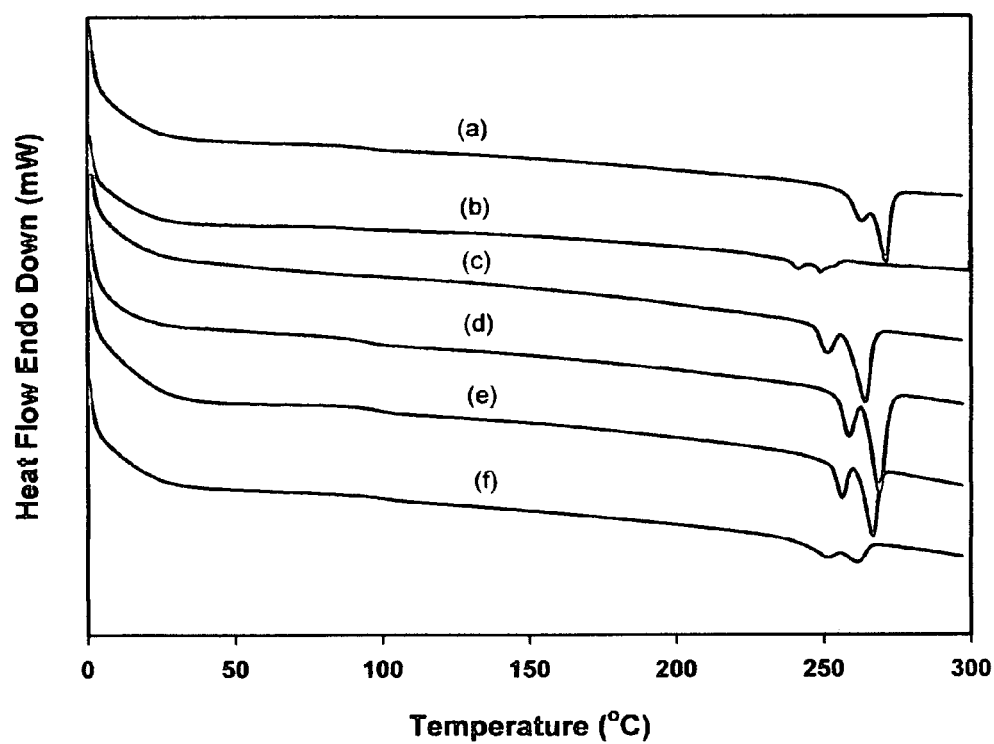
FIG. 1 shows graphic renditions of DSC scans (i.e., thermal properties) of six examples of polymers treated according to technology described herein.

An existing polymer having at least some pendant or backbone aromatic groups is reacted to form a boronic ester on pendant or backbone aromatic groups. These pendant or backbone aromatic groups with boronic ester functionalities are themselves useful with their modified properties or become useful reagents for further modification of polymer properties.

The aromatic polymers useful in the process of the present invention include any polymeric material containing aromatic functionality either in a pendant side group or in a main group. Preferably the $M_n$ is at least 20,000 and preferably at least 40,000. There may not be any functional upper limit, but more preferred upper limits are to less than one million, less than 500,000, to less than 400,000, to less than 250,000, and to less than 120,000 number average molecular weight ($M_n$). Pendant aromatic refers to a structure wherein the aromatic group is a substituent on the polymer backbone and not embedded therein. Preferred aromatic groups are $C_{6-20}$ aryl groups, especially phenyl groups. Homopolymers may have any stereoregular structure including syndiotactic, isotactic or atactic polymers. In addition, copolymers containing these aromatic monomers including random, pseudo random, block and grafted copolymers may be used. For example, copolymers of vinyl aromatic monomers and comonomers selected from nitriles, acrylates, acids, ethylene, propylene, maleic anhydride, maleimides, vinyl acetate, and vinyl chloride may also be used such as styrene-acrylonitrile, styrene-alpha-methylstyrene and styrene-ethylene. Block copolymers of vinyl aromatic monomers and conjugated dienes such as butadiene, isoprene may also be used. Examples include styrene-butadiene, styrene-isoprene, styrene-butadiene-styrene and styrene-isoprene-styrene copolymers. Further examples of block copolymers may be found in U.S. Pat. Nos. 4,845,173, 4,096,203, 4,200,718, 4,201,729, 4,205,016, 3,652,516 3,231,635, and 3,030,346. Blends of polymers including impact modified, grafted rubber containing aromatic polymers may also be used. Aromatic main chain polymers refer to a structure wherein the aromatic group is located in the main chain of polymer repeating unit. Examples include but not limited to polysulfones, polyesters, polycarbonates, polyamides, polyimides, polyphenylene sulfide, polyphenylene oxide, polybenzimidazole, poly(ether ketone), and polyarylenes.

As an example of modification of aromatic side chain polymer, the iridium-catalyzed reactions of commercial polystyrenes (sPS, aPS, iPS) with pinacolborane (HBpin) or bis (pinacolato)diboron ($B_2pin_2$) in cyclooctane at 150° C. produced the corresponding borylated polymers (PS-Bpin) shown in Scheme 1. Among the catalysts screened+[IrCl (COD)]$_2$/dtbpy (COD=1,5-cyclooctadiene; dtbpy=4,4'-di-tert-butyl-2,2'-bipyridine), [Ir(OMe)(COD)]$_2$/dtbpy, [IrCl (COE)$_2$]$_2$/dtbpy (COE=cyclooctene), and Cp*Rh($C_6Me_6$))- [IrCl(COD)]$_2$/dtbpy, [Ir(OMe)(COD)]$_2$/dtbpy, and [IrCl (COE)$_2$]$_2$/dtbpy were comparatively effective catalysts for the C—H activation/borylation of polystyrenes with $B_2pin_2$ at 150° C. Although all three iridium catalysts screened were found active for the C—H activation of aromatic rings of polystyrenes, we found [IrCl(COD)]$_2$/dtbpy was the most active catalyst at 150° C. and demonstrated here for the C—H activation/borylation of sPS, which has a number-average molecular weight ($M_n$) of 127 kg/mol and a PDI of 2.64. Because sPS has poor solubility in common organic solvents, the C—H functionalization was conducted in the inert high-boiling-point solvent cyclooctane at an elevated temperature (150° C.) to achieve a homogeneous condition. However, other aromatic polymers that have good solubility in organic solvent (cycloalkane, linear alkane, tetrahydrofuran, dimethylformamide, etc) can be functionalized with the iridium catalyst even at room temperature. The arene C—H activation/borylation is known to occur selectively only at the aromatic ring of arenes, so this functionalization would allow generation of borylated polystyrenes of different tacticities (syndiotactic, isotactic, atactic) in a single step using the commercially available catalyst. Although we did not identify the ratio of regioisomers of borylated products, the borylation was assumed to give sterically controlled statistical isomers of polymers as in the case of the aromatic C—H borylation of small arenes (e.g., a mixture of meta- and para-substituted isomers).

The isolated PS-Bpin products were characterized using various spectroscopic methods. $^1H$ NMR spectra of all PS-Bpins (syndiotactic, isotactic, atactic) gave rise to a distinctive new resonance at ~1.2-1.3 ppm (1.35 ppm for sPS-Bpin in CDCl$_3$, 1.20 ppm for aPS-Bpin and iPS-Bpin in $C_6D_6$) for the four methyl groups of Bpin. The two resonances from $CH_2$ and CH of the polystyrene main chain maintained a ratio of 2:1, confirming that the methylene and methine groups of polystyrene were intact during the borylation. In the case of sPS-Bpin, the presence of a single resonance for an aromatic quaternary carbon at 145.2 ppm in the $^{13}C$ NMR spectrum indicates that the functionalized polymer preserved high syndiotacticity. In addition, the $^{13}C$ NMR spectrum of sPS-Bpin showed new sharp resonances at 83.5 ppm and 24.9 ppm for the Bpin group. $^{13}$C NMR attached proton test (APT) and distortionless enhancement by polarization transfer (DEPT) spectroscopies of sPS-Bpin confirmed that the two resonances corresponded to the methyl and the quaternary carbon atoms of the Bpin structure. The $^{11}$B NMR spectrum of sPS-Bpin showed a broad peak at 30 ppm, which is a typical resonance for the aryl-Bpin moiety.

The mol % of the borylated styrene repeating unit was calculated from the $^1$H NMR spectrum by integrating the ratio of the methylene proton of the polystyrene main chain and methyl groups of Bpin. These results are summarized in Tables 1 and 2. Note that the efficiency of functionalization in Tables 1 and 2 is defined as the percentage of borylated styrene units relative to boron atoms added. Regardless of the tacticity of polymers, all polystyrenes could be efficiently functionalized with varying numbers of boryl groups. Except for the functionalizations of sPS that use a very low ratio of added $B_2pin_2$ to monomer unit (ratios <0.1, entries 1-3 of Table 1), both sPS and aPS generally showed decreased efficiency of functionalization when the added diboron ratio was increased (Table 1, entries 4-7 for sPS and entries 8-12 for aPS). The reason for the exceptional cases of sPS is unclear and needs further study. The effect of solubility on the efficiency of functionalization was observed in the case of iPS. Because of its extremely high molecular weight ($M_n$=309 kg/mol, PDI=6.42) iPS was much less soluble in the cyclooctane solvent even at 150° C. Thus, iridium-catalyzed C—H borylation of iPS under the standard conditions listed in Table 1 was significantly less efficient. Addition of more solvent completed the dissolution of the polymer; however, the solvent dilution also induced a decrease in efficiency compared to the standard conditions for sPS-Bpin (Table 1, entries 4 and 13). Similarly, the borylation of sPS under the identical diluted condition also resulted in a slightly reduced efficiency compared to the standard condition (entries 4 and 14). Unlike other transition metal-catalyzed polyolefin functionalizations, the iridium-catalyzed borylation of sPS was highly effective even at low catalyst loading (i.e., 0.5 mol % iridium catalyst in entry 15 of Table 1). Although a ratio of $B_2pin_2$ to styrene unit higher than 0.8 has not been tried, a maximum 41 mol % of sPS styrene repeating unit can be easily borylated with $B_2pin_2$ using 3 mol % of the commercially available iridium catalyst and the ligand under this method (Table 1, entry 7).

To investigate whether any changes in average molecular weights and molecular weight distributions occurred during the C—H activation/borylation process, we subjected a model aPS material with narrow molecular weight distribution to the standard borylation condition; an $M_n$ of 26.3 kg/mol and a PDI of 1.00. With these model polymers we can easily detect side reactions that will induce any chain cleavage or chain coupling during the borylation. As shown in Table 1 (entries 8-12), an increase in the ratio of $B_2pin_2$/monomer resulted in an $M_n$ increase owing to the incorporation of more Bpin group in aPS-Bpin. The PDI values always remained at 1.01, however, even with the incorporation of 33 mol % of Bpin group (Table 1, entry 12). These data clearly indicate that the iridium-catalyzed C—H activation/borylation process does not induce any deleterious side reactions that lead to chain cleavage or chain coupling of polymers. To our knowledge, such a high level of postfunctionalization of commercial high-molecular-weight polyolefin that maintains the fidelity of the narrow polydispersity of starting polymer is unprecedented. The molecular weight data of sPS (Table 1, entries 1-6) and iPS (Table 1, entry 13) were measured using high-temperature size exclusion chromatography in 1,2,4-trichlorobenzene at 160° C. These data were also consistent with those of aPS. The iridium-catalyzed C—H borylation can also be accomplished with pinacolborane (HBpin) as the boron reagent (Table 2). Although the efficiency of functionalization with HBpin was lower than that of $B_2pin_2$, the borylation using various ratios of HBpin to styrene repeating unit produced 1-10 mol % Bpin-functionalized sPS and aPS. Again both $M_n$ and PDI after postfunctionalization were unchanged from those of the starting polymers.

The boronic ester group can be transformed to other boron functionality such as —$B(OH)_2$ and —$BF_3K$. To explore the possibility of introducing a polar group into nonpolar polystyrenes, sPS-Bpin (entries 1-7) and aPS-Bpin (entry 10) were oxidized with $NaOH/H_2O_2$ in THF to give the corresponding hydroxylated polymers, sPS-OH and aPS-OH, respectively (Scheme 2). The hydroxyl group of sPS-OH could be easily identified using IR spectroscopy by a strong O—H stretching band at 3477 $cm^{-1}$. The complete disappearance of resonances of the Bpin group in the $^{13}$C NMR spectrum of sPS-OH demonstrated successful oxidation in the polymer chain. The molecular weight changes from the borylation-oxidation sequence, which was studied in depth with model aPS, were negligible (aPS: $M_b$=26.3 kg/mol, PDI=1.00; aPS-Bpin: $M_n$=28.9 kg/mol, PDI=1.00; aPS-OH: $M_n$=27.2 kg/mol, PDI=1.01), highlighting the mildness of this protocol. Aryl boronic ester is a versatile synthon for C—C bond formation via Suzuki-Miyaura cross-coupling. Because a variety of functional groups (such as silane, halide, phosphine, hydroxy, amine, carbonyl, nitrile, sulfonyl, alkyl, alkenyl, alkynyl, aryl, etc) are available for aryl halides (Ar—X, where X=Cl, Br, I, $CF_3SO_3$ [triflate], $CH_3$—$C_6H_4$—$SO_3$ [tosylate]) and these groups can be tolerated in Suzuki-Miyaura cross-coupling reaction, the coupling reaction of polymer Bpin and aryl halide can introduce many examples of functional group at the end of aromatic side chain of the polymer. Here, we illustrate an example of the coupling reaction of the polymer Bpin groups with aryl bromide containing silane group for convenient characterization of the polymer product (Scheme 2). With 3 mol % of palladium catalyst, the aryl bromide coupled with PS-Bpin to form an arene-functionalized polystyrene. The $^1$H NMR spectra of the coupled products showed the complete disappearance of Bpin groups in PS-Bpin and the appearance of a t-butyldimethylsilyl group with a similar concentration. The molecular weight parameters of the Suzuki coupling product, which was studied in depth with the model aPS, were again found to be unchanged from those of the starting polymer (aPS-Bpin: $M_n$=27.8 kg/mol, PDI=1.00; aPS-Ar: $M_n$=31.9 kg/mol, PDI=1.02).

The thermal properties of unfunctionalized sPS, sPS-Bpin, and sPS-OH are displayed in FIG. 1. Although sPS has high crystallinity, the melting point and crystallinity of functionalized sPS are heavily dependent on the size and concentration of the functional group on the polymer. Until 5 mol % incorporation of the boryl group, the sPS-Bpin showed a systematic lowering of both melting point and crystallinity as more Bpin groups were attached. If more than 6 mol % of the Bpin group was present in the polymer, the melting point of sPS-Bpin disappeared because the bulky Bpin group disrupted crystallization. The glass transition temperature of sPS-Bpin was, however, unchanged (~100° C.) compared to that of the parent polymer. After oxidation, sPS-OH recovered crystallinity because the smaller hydroxyl group did not interfere with the crystallization process as the bulky Bpin group did. Thus, the sPS-Bpin containing 5.9 mol % Bpin group (entry 2 of Table 1) lost crystallinity completely. However, the sPS-OH with 9.9 mol % OH group (from oxidation of entry 3 of Table 1) still preserved high crystallinity (36%), which was close to the crystallinity of unfunctionalized sPS (40%), and showed a slightly lower melting point (267° C.) [FIG. 1 (e)]. Overall, the borylation-oxidation process can yield polar hydroxy group functionalized sPS that has a slightly lower melting point without changing molecular weight of the parent polymer.

Functionalization of commercial polystyrenes with three types of tacticity-syndiotactic, isotactic, and atactic—was accomplished with the iridium-catalyzed borylation of arene C—H bonds. The functionalization allowed the introduction of a boronate ester group without negatively affecting the molecular weight and the tacticity of the starting polymer. The concentration of the boryl group can be easily controlled with as low as 0.5 mol % of iridium catalyst loading by changing the ratio of boron reagent to monomer unit, regardless of the tacticity of the polymer. The boryl group in the polystyrene was further converted to other functional groups such as hydroxyl and functionalized arene via oxidation and Suzuki-Miyaura coupling, respectively. This new method to install functional groups into crystalline polystyrenes will expand the commercial possibilities of these important polyolefins such as in polymer blends, recoverable polymer catalyst, and adhesion with other materials.

Scheme 1. C—H activation/borylation of polystyrenes with iridium catalyst. PS = polystyrene; aPS = atactic polystyrene; sPS = syndiotactic polystyrene; iPS = isotactic polystyrene; B$_2$pin$_2$ = bis(pinacolato)diboron; HBpin = pinacolborane; dtbpy = 4,4'-di-tert-butyl-2,2'-bipyridine.

Scheme 2. Oxidation (from Table 1, entries 1-7 for sPS-Bpin and entry 10 for aPS-Bpin) and Suzuki-Miyaura coupling reaction (from Table 1, entry 3 for sPS-Bpin and entry 9 for aPS-Bpin) of PS-Bpin.

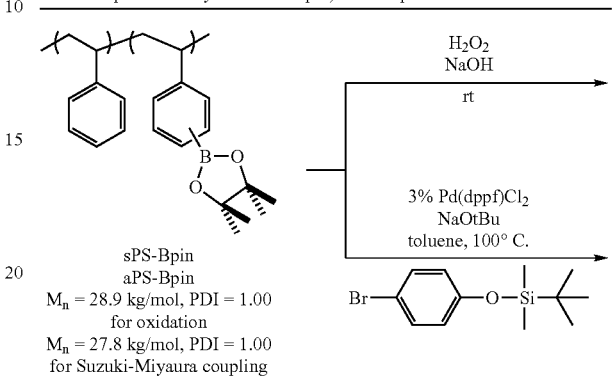
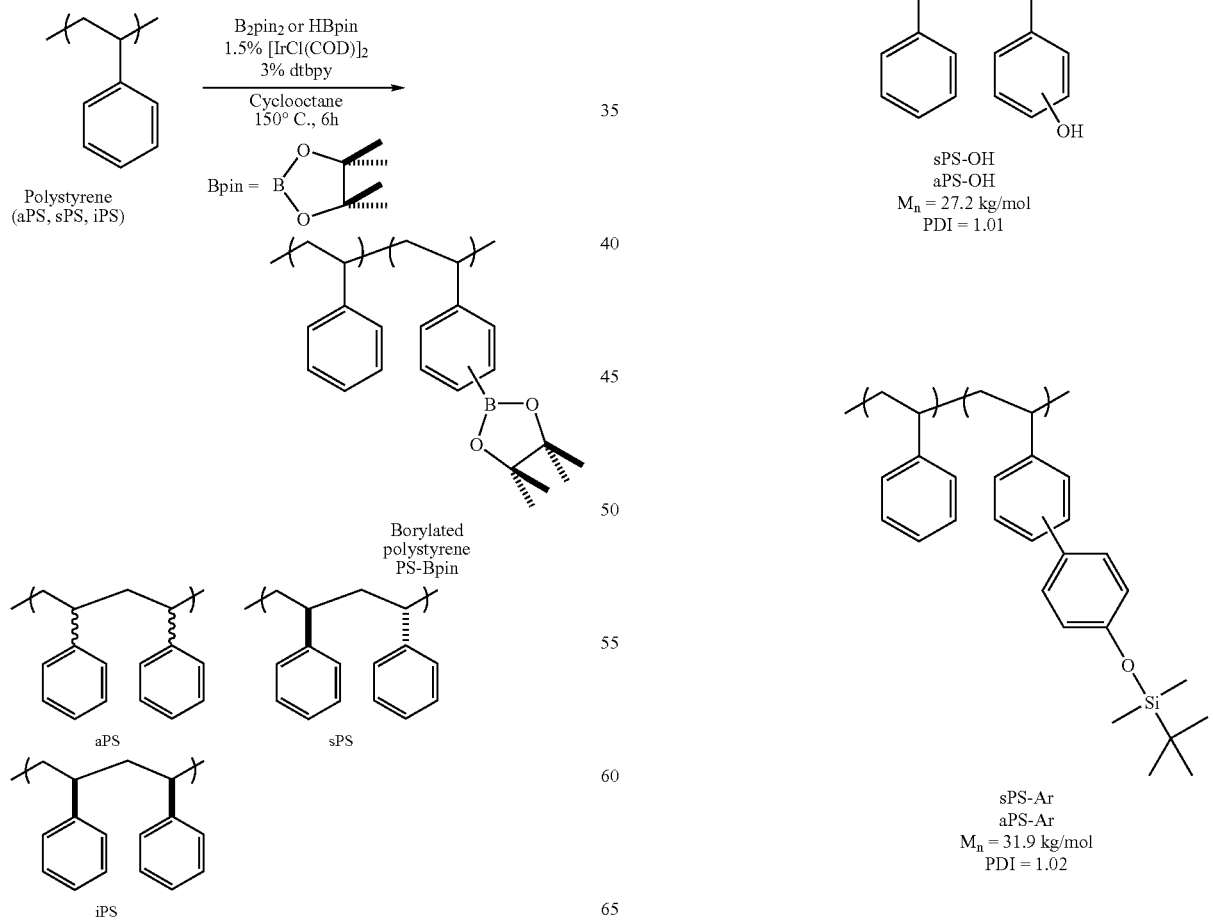

TABLE 1

Borylation of polystyrene (PS) with bis(pinacolato)diboron ($B_2pin_2$)[a]

| | | | | | PS-Bpin | | | |
|---|---|---|---|---|---|---|---|---|
| Entry | PS[b] | $M_n$[c] | PDI ($M_w/M_n$) | [$B_2pin_2$]/ [monomer] | $M_n$[c] | PDI ($M_w/M_n$) | Bpin (%)[d] | Effic (%)[e] |
| 1 | sPS | 127[f] | 2.64[f] | 0.03 | 132[f] | 2.37[f] | 2.5 | 42 |
| 2 | sPS | 127[f] | 2.64[f] | 0.05 | 116[f] | 2.74[f] | 5.9 | 59 |
| 3 | sPS | 127[f] | 2.64[f] | 0.07 | 116[f] | 2.53[f] | 9.9 | 71 |
| 4 | sPS | 127[f] | 2.64[f] | 0.1 | 90.0[f] | 2.50[f] | 16.4 | 82 |
| 5 | sPS | 127[f] | 2.64[f] | 0.2 | 124[f] | 2.40[f] | 23.6 | 59 |
| 6 | sPS | 127[f] | 2.64[f] | 0.4 | 97.0[f] | 2.55[f] | 34.2 | 43 |
| 7 | sPS | 127[f] | 2.64[f] | 0.8 | N.M[i] | N.M[i] | 41.1 | 26 |
| 8 | aPS | 26.3 | 1.00 | 0.05 | 27.3 | 1.00 | 8.4 | 84 |
| 9 | aPS | 26.3 | 1.00 | 0.07 | 27.8 | 1.00 | 11.1 | 80 |
| 10 | aPS | 26.3 | 1.00 | 0.1 | 28.9 | 1.00 | 16.4 | 82 |
| 11 | aPS | 26.3 | 1.00 | 0.2 | 29.8 | 1.00 | 22.4 | 56 |
| 12 | aPS | 26.3 | 1.00 | 0.4 | 31.1 | 1.01 | 32.8 | 41 |
| 13[g] | iPS | 309[f] | 6.42[f] | 0.1 | 418[f] | 5.00[f] | 10.6 | 50 |
| 14[g] | sPS | 127[f] | 2.64[f] | 0.1 | N.M[i] | N.M[i] | 13.7 | 69 |
| 15[h] | sPS | 127[f] | 2.64[f] | 0.1 | N.M[i] | N.M[i] | 12.9 | 65 |

[a]Unless otherwise specified, borylations were conducted on 260 mg of polymer with 3 mol % of iridium and 3 mol % of ligand relative to $B_2pin_2$ in 1.7 g of cyclooctane at 150° C. for 6 h.
[b]aPS = atactic polystyrenes; sPS = syndiotactic polystyrene; iPS = isotactic polystyrene.
[c]Number-average molecular weight ($M_n$) measured with size exclusion chromatography in THF at 40° C. relative to PS standards unless otherwise specified.
[d]Mol % of Bpin functionalized styrene unit calculated from $^1$H NMR spectrum.
[e]Efficiency of functionalization (i.e., the percentage of functionalized styrene unit relative to boron atoms added).
[f]Measured with high-temperature size exclusion chromatography in 1,2,4-trichlorobenzene at 180° C. with PS standards.
[g]Borylation conducted in 2.8 g of cyclooctane.
[h]0.5 mol % of iridium and 0.5 mol % of ligand were used.
[i]Not measured.

TABLE 2

Borylation of polystyrene (PS) with pinacolborane (HBpin)[a]

| | | | | | PS-Bpin | | | |
|---|---|---|---|---|---|---|---|---|
| Entry | PS[b] | $M_n$[c] | PDI ($M_w/M_n$) | [HBpin]/ [monomer] | $M_n$[c] | PDI ($M_w/M_n$) | Bpin (%)[d] | Effic (%)[e] |
| 1 | sPS | 127[f] | 2.64[f] | 0.05 | N.M[g] | N.M[g] | 2.6 | 52 |
| 2 | sPS | 127[f] | 2.64[f] | 0.1 | N.M[g] | N.M[g] | 4.5 | 45 |
| 3 | sPS | 127[f] | 2.64[f] | 0.2 | 82.1[f] | 2.65[f] | 7.1 | 36 |
| 4 | sPS | 127[f] | 2.64[f] | 0.4 | 93.8[f] | 2.38[f] | 9.8 | 25 |
| 5 | aPS | 26.3 | 1.00 | 0.1 | 27.0 | 1.00 | 4.0 | 40 |
| 6 | aPS | 26.3 | 1.00 | 0.4 | 27.3 | 1.00 | 5.9 | 15 |
| 7 | aPS | 230 | 1.02 | 0.1 | 246 | 1.02 | 4.0 | 40 |
| 8 | aPS | 230 | 1.02 | 0.4 | 247 | 1.02 | 5.6 | 14 |

[a]Unless otherwise specified, borylations were conducted with 260 mg of polymer with 3 mol % of iridium and 3 mol % of ligand relative to HBpin in 1.7 g of cyclooctane at 150° C. for 16 h.
[b]aPS = atactic polystyrenes [$M_n$ = 26.3 kg/mol, polydispersity index (PDI) = 1.00 and $M_n$ = 230 kg/mol, PDI = 1.02]; sPS = syndiotactic polystyrene [$M_n$ = 127 kg/mol, PDI = 2.64]
[c]Number-average molecular weight ($M_n$) measured with size exclusion chromatography in THF at 40° C. relative to PS standards unless otherwise specified.
[d]Mol % of Bpin functionalized styrene unit calculated from $^1$H NMR spectrum.
[e]Efficiency of functionalization (i.e., the percentage of functionalized styrene unit relative to boron atoms added).
[f]Measured with high-temperature size exclusion chromatography in 1,2,4-trichlorobenzene at 180° C. with PS standards.
[g]Not measured.

TABLE 3

Thermal properties of sPS and functionalized sPS[a]

| Polymer | Functional Group | $T_g$ (° C.)[b] | $T_m$ (° C.)[c] | $\Delta H_f$ (J/g)[d] | % Crystallinity[e] |
|---|---|---|---|---|---|
| sPS | None | 99 | 271 | 21.1 | 40 |
| sPS-Bpin | 2.5 mol % Bpin | 95 | 249 | 3.1 | 6 |

TABLE 3-continued

Thermal properties of sPS and functionalized sPS[a]

| Polymer | Functional Group | $T_g$ (° C.)[b] | $T_m$ (° C.)[c] | $\Delta H_f$(J/g)[d] | % Crystallinity[e] |
|---|---|---|---|---|---|
| sPS-Bpin | 5.9 mol % Bpin | 109 | N.D[f] | — | — |
| sPS-OH | 2.5 mol % OH | N.D[f] | 264 | 19.5 | 37 |
| sPS-OH | 5.9 mol % OH | 100 | 269 | 17.9 | 34 |
| sPS-OH | 9.9 mol % OH | 104 | 267 | 19.2 | 36 |
| sPS-OH | 16.4 mol % OH | 106 | 261 | 8.3 | 16 |
| sPS-OH | 23.6 mol % OH | 118 | 260 | 0.9 | 2 |
| sPS-OH | 34.2 mol % OH | 129 | N.D[f] | — | — |

[a]Differential scanning calorimetry (DSC) measurements conducted using heating/cooling rates of 10° C./min.
[b]Glass transition temperature in ° C.
[c]Melting point of polymer in ° C.
[d]Heat of fusion of polymer in J/g.
[e]The percent of crystallinity based on the theoretical heat of fusion calculated for 100% crystalline sPS (i.e., $\Delta H_f^\circ$ = 53.3 J/g; M. Malanga, Adv. Mater. 2000, 12, 1869).
[f]Not detected.

EXAMPLES sPS ($M_n$=127 kg/mol, PDI=2.64] from LG Chemical Ltd., Daejeon, S. Korea, model atactic polystyrenes of two different molecular weights ($M_n$=26.3 kg/mol, PDI=1.00) from Aldrich Chemical Co., dtbpy, [IrCl(COD)]$_2$, HBpin, hydrogen peroxide, tetrahydrofuran, sodium hydroxide, and chloroform were reagent grade and used without further purification. $B_2pin_2$ was obtained from Frontier Scientific Co. and used after recrystallization from hexane. Cyclooctane was dried using sodium and benzophenone, distilled under reduced pressure, and stored in a nitrogen-filled glove box. To improve the solubility of iPS ($M_w$=309 kg/mol, 90% isotactic, PDI=6.42 from Aldrich Chemical Co.) in the borylation medium, the following procedure was performed. One gram of the polymer was placed in a two neck round-bottom flask, and then the flask was evacuated and backfilled with nitrogen three times. 1,2-Dichlorobenzene (30 mL) was added to this flask and refluxed at 180° C. under nitrogen for 30 min to dissolve all of the iPS. The solution was cooled to 140° C. and precipitated in cold methanol (300 mL). The precipitate was filtered and dried under vacuum at 60° C.

$^1$H NMR spectra were obtained using a 400 MHz Varian NMR spectrometer at room temperature and chemical shifts were referenced to TMS. The NMR samples were prepared by applying gentle heat to dissolve polymer in CDCl$_3$ (for functionalized sPS products) and C$_6$D$_6$ (for functionalized aPS products). The $^1$H NMR samples were prepared at the concentration of 10 mg (polymer)/1 mL (NMR solvent). The Bpin mol % of PS-Bpin was determined based on the relative area of —CH— in PS main chain ($\delta$=1.81 in CDCl$_3$, $\delta$=2.10 in C$_6$D$_6$) to —CH$_3$ of Bpin ($\delta$=1.35 in CDCl$_3$, $\delta$=1.15-1.20 in C$_6$D$_6$) in the spectra and provided in Tables 1 and 2. For molecular weight characterization of aPS materials, size exclusion chromatography (SEC) analysis was conducted using a VISCOTEK chromatograph equipped with three visco-GEL I Series columns and tetra detector array (UV/Vis, low and right angle light scattering, refractive index, viscometer) at 40° C. Tetrahydrofuran (THF) was the mobile phase and the flow rate was set at 1.0 m/min. High temperature size exclusion chromatography analyses for the molecular weight measurement of sPS and iPS were obtained using a Polymer Laboratory GPC-220 high temperature size exclusion chromatography at 160° C. 1,2,4-Trichlorobenzene was the mobile phase and the flow rate was set at 1.0 mL/min. Both instruments were calibrated using polystyrene standards. Differential Scanning Calorimetry (DSC) measurements were conducted on a Perkin Elmer Pyris 6 DSC series under a nitrogen atmosphere. The polymer samples were heated to 300° C., hold at 300° C. for 1 min in order to remove the influence of thermal history, cooled to 0° C., and then reheated to 300° C., all at a rate of 10° C./min.

sPS: $^1$H NMR (400 MHz, CDCl$_3$) $\delta$=1.30 (2H, CH$_2$), 1.81 (1H, CH), 6.55 (2H, H$_{arom}$), 7.06 (3H, H$_{arom}$); $^{13}$C {$^1$H} NMR (100 MHz, CDCl$_3$) $\delta$=40.54 (CH), 43.84 (CH$_2$), 125.60 (Ph-C4), 127.60 (Ph-C2,6), 127.86 (Ph-C3,5), 145.19 (Ph-C1).

Preparation of Sps-Bpin

In a nitrogen-filled glove box, a mixture of syndiotactic polystyrene (260 mg), boron reagent (different ratios described in Tables 1 and 2), iridium catalyst (3 mol % iridium based on the amount of boron reagent), ligand (3 mol % based on the amount of boron reagent), cyclooctane (1.7 g), and a magnetic stirring bar were placed into a vial and capped with a Teflon-lined septum. The vial was removed from the glove box and placed in an oil bath at 150° C. for 6 h. After cooling to room temperature, the mixture was dissolved in chloroform (30 mL) and filtered through a short plug of silica to remove the catalyst. The filtrate was concentrated by rotary evaporator and precipitated by adding cold methanol. The precipitated solid was filtered and dried under vacuum at 60° C.: $^1$H NMR (400 MHz, CDCl$_3$) $\delta$=1.30 (2H, CH$_2$), 1.35 (s, BOCCH$_3$), 1.80 (1H, CH), 6.54 (2H, H$_{arom}$), 7.05 (3H, H$_{arom}$) 7.56 (H H$_{arom}$ from Ph-Bpin); $^1$H NMR (400 MHz, C$_6$D$_6$) $\delta$=1.15 and 1.19 (BOCCH$_3$), 1.49 (2H, CH$_2$), 2.08 (1H, CH), 6.07 (2H, H$_{arom}$), 7.05 (3H, H$_{arom}$); $^{13}$C {$^1$H} NMR (100 MHz, CDCl$_3$) $\delta$=24.88 (BOCCH$_3$), 40.53 (CH), 43.83 (CH$_2$), 83.51 (BOCCH$_3$), 125.60 (Ph-C4), 127.66 (Ph-C2,6), 127.85 (Ph-C3,5), 144.60 (C$_{arom}$ from Ph-Bpin), 145.18 (Ph-C1), 148.79 (C$_{arom}$ from Ph-Bpin); $^{11}$B NMR (128.26 MHz, CDCl$_3$) $\delta$=30.36 (br).

Preparation of sPS-OH sPS-Bpin (100 mg) (from entry 3 of Table 1) was dissolved in THF in a 250 ml flask by applying gentle heating and then cooled to room temperature. A mixture of aqueous NaOH (1 mL of 3 M) and 30% H$_2$O$_2$ (1 mL) was added slowly to the polymer solution at room temperature. The resulting solution was stirred at room temperature for 12 h. The solution was concentrated with a rotary evaporator, and a mixture of methanol and water (40 mL/10 mL) was added. The heterogeneous suspension was stirred for 20 min and filtered. The collected white solid was washed with water (3×10 mL) and then with methanol (3×5 mL). The solid was dried under vacuum at 60□: $^1$H NMR (400 MHz, CDCl$_3$) δ=1.30 (2H, CH$_2$), 1.80 (1H, CH), 6.54 (2H, H$_{arom}$), 7.05 (3H, H$_{arom}$); $^{13}$C {$^1$H} NMR (100 MHz, 1,1,2,2-tetrachloroethane-d$_2$ at 70° C.) δ=40.74 (CH), 43.83 (CH$_2$), 125.59 (Ph-C4), 127.63 (Ph-C2,6), 127.90 (Ph-C3,5), 137.47 (HO-p-Ph-Cl), 145.16 (Ph-Cl), 147.23 (HO-m-Ph-Cl), 153.02 (HO-p-Ph-C4), 154.86 (HO-m-Ph-C3); FT-IR (film) ν=3477 cm$^{-1}$ (O—H).

Suzuki Coupling of sPS-Bpin

In a nitrogen glove box, a mixture of sPS-Bpin (50 mg, entry 3 of Table 1), 4-bromo-phenoxy-tert-butyldimethylsilane, palladium catalyst (dichloro[1,1'-bis(diphenylphosphino)-ferrocene]palladium(II); 3 mol % based on the amount of boron concentration in sPS-Bpin), sodium tert-butoxide (3 equivalent to the amount of boron concentration in sPS-Bpin), toluene (1 mL), and a magnetic stirring bar were placed into a vial and capped with Teflon-lined septum. The vial was removed from the glove box and placed in an oil bath at 100° C. for 22 h. After cooling, the mixture was dissolved in chloroform (15 mL) and filtered through a short plug of silica. The filtrate was concentrated using a rotary evaporator and precipitated by adding cold methanol. The white precipitated solid was filtered and dried under vacuum at 60° C.: $^1$H NMR (400 MHz, CDCl$_3$) δ=0.24 (s, Si(CH$_3$)$_2$C(CH$_3$)$_3$), 1.02 (s, Si(CH$_3$)$_2$C(CH$_3$)$_3$) 1.30 (2H, CH$_2$), 1.80 (1H, CH), 6.54 (2H, H$_{arom}$), 7.06 (3H, H$_{arom}$); $^{13}$C {$^1$H} NMR (100 MHz, CDCl$_3$) δ=-4.35 (Si(CH$_3$)$_2$C(CH$_3$)$_3$), 18.26 (Si(CH$_3$)$_2$C(CH$_3$)$_3$), 25.74 (Si(CH$_3$)$_2$C(CH$_3$)$_3$), 40.54 (CH), 43.84 (CH$_2$), 120.16 (C$_c$), 125.59 (Ph-C4), 127.67 (Ph-C2,6), 127.85 (Ph-C3,5), 128.00 (C$_b$), 134.61 (C$_a$), 145.19 (Ph-C1), 154.99 (C$_d$).

Various processes have been proposed in the prior art for boronation of aromatic hydrocarbons. For example, processes are known for lithionation, halogenation or boronation after converting to a trifurate of a benzene ring, examples of which include (1) a process using aryl halide or aryl trifurate and pinacol diboron (P. Rocca et al., J. Org. Chem., 58, 7832, 1993), (2) a process involving reaction with boric ester following lithionation of an aromatic ring, and (3) a process involving reaction with boric ester following reaction of aryl halide with magnesium (A. R. Martin, Y Yang, Acta. Chem. Scand., 47, 221, 1993).

In addition, known examples of direct boronation of benzene include (4) a process that uses a metal-halogen exchange followed by reaction with B(OCH$_3$)$_3$ (T. R. Kelly et al., Tetrahedron Lett., 35, 7621 (1994), P. D. Hobbs et al., J. Chem. Soc. Chem. Commun., 923 (1996), T. R. Hoye, M. Chen, J. Org. Chem., 61, 7940 (1996)), (5) a process that uses an Ir-based catalyst (Iverson, C. N., Smith, M. R., III. J. Am. Chem. Soc., 121, 7696 (1999), Cho, J. Y, Tse, M. K., Holmes, Science, 295, 305 (2002), Ishiyama, T., Takagi, J., Ishida, K., Miyaura, N., Anastasi, N. R., Hartwig, J. F., J. Am. Chem. Soc., 124, 390 (2002)), (6) a process that uses an Re-based catalyst (Chen. H., Hartwig, J. F., Agnew. Chem. Int. Ed., 38, 3391 (1999)), and (7) a process that uses an Rh-based catalyst (Chen, H., Hartwig, J. F., Science, 287, 1995 (2000), Cho, J. Y, Iverson, C. N., Smith, M. R., III. J. Am. Chem. Soc., 122, 12868 (2000), Tse, M. K., Cho, J. Y, Smith, M. R., III. Org. Lett., 3, 2831 (2001), Shimada, S., Batsanov, A. S., Howard, J. A. K, Marder, T. B., Angew. Chem. Int. Ed., 40, 2168 (2001)).

However, there are few examples of boronation reactions of aromatic heterocyclic compounds, with the only known example being a process in which silver acetate is allowed to act on indole followed by reaction with borane followed additionally by hydrolysis (K. Kamiyama, T. Watanabe, M. Uemura, J. Org. Chem., 61, 1375 (1996)) and the disclosure of Published US Patent Application No. 20050148775, which is incorporated herein by reference.

The catalysts used herein may be iridium based catalysts (Ir-catalysts), Re-catalysts, and Rh-catalysts. The iridium-containing catalyst used in the present invention may be any such catalyst provided it is a compound that contains iridium (Ir), the iridium-containing catalyst is preferably a catalyst represented by the following general formula:

composed of a cation portion represented by Ir, an anion portion represented by A and an alkene portion represented by B. More preferably, the anion portion represented by A is a chlorine atom, alkoxy group, hydroxyl group or phenyloxy group which may or may not have a substituent, B is an alkene-containing compound such as COD (1,5-cyclooctadiene), COE (1-cyclooctene) or indene, and n is 1 or 2. Specific examples include IrCl(COD), IrCl(COE)$_2$, Ir(OMe)(COD), Ir(OH)(COD) and Ir(OPh)(COD). The amount used is {fraction (1/100000)} to 1 mole, and preferably {fraction (1/10000)} mole to {fraction (1/10)} mole, with respect to bis(pinacolate) diboron or pinacol borane.

Although there are no particular restrictions on the ligand in these catalysts provided it is a Lewis base having the ability to coordinate to an iridium-containing catalyst, it is preferably a bidentate Lewis base compound, and more preferably, a compound represented with a partial structure of bipyridine which may or may not have symmetric or asymmetric substitution such as hydrogen atom, linear or branched C$_{1-8}$ alkyl group, linear or branched C$_{1-8}$ alkoxy group, nitro group, cyano group, halogenated C$_{1-8}$ alkyl group, halogen atom, carbamoyl group, C$_{1-8}$ acyl group, C$_{1-8}$ alkoxycarbonyl group or amino group which may or may not have a substituent, or in which substitution at position 6 and position 6' may include a hydrogen atom, linear or branched C$_{1-8}$ alkyl group, linear or branched C$_{1-8}$ alkoxy group, nitro group, cyano group, halogenated C$_{1-8}$ alkyl group, halogen atom, carbamoyl group, C$_{1-8}$ acyl group, C$_{1-8}$ alkoxycarbonyl group, or amino group which may or may not have a substituent), specific examples of which include trialkyl phosphines such as triphenyl phosphine and tributyl phosphine; ethylenediamines such as tetramethylethylenediamine and ethylenediamine; bipyridines such as 4,4'-di-t-butyl bipyridine, 2,2'-bipyridine, 4,4'-di-methoxy bipyridine, 4,4'-bis(dimethylamino)bipyridine, 4,4'-dichlorobipyridine and 4,4'-dinitrobipyridine, and 1,10-phenanthroline, and preferable specific examples including bipyridines such as 4,4'-di-t-butyl bipyridine, 2,2'-bipyridine, 4,4'-di-methoxybipyridine, 4,4'-bis(dimethylamino)bipyridine, 4,4'-dichlorobipyridine and 4,4'-dinitrobipyridine. The amount used is {fraction (1/100000)} mole to 1 mole, and preferably {fraction (1/10000)} mole to {fraction (1/10)} mole, with respect to bis(pinacolate)diboron or pinacolborane.

There are no particular restrictions on the solvent used in the present invention provided it does not have an effect on the reaction, and examples of such solvents include hydrocarbons such as octane, pentane, heptane and hexane; amides such as dimethylformamide and dimethylacetoamide; pyrrolidones such as N-methyl-2-pyrrolidone; ketones and sulfoxides such as acetone, ethyl methyl ketone and dimethylsulfoxide; aromatic hydrocarbons such as benzene, toluene, xylene and mesitylene; nitriles such as acetonitrile; ethers such as diisopropyl ether, tetrahydrofuran, 1,4-dioxane, 1,2-dimethoxyethane and anisole; and alcohols such as methanol, ethanol, propanol, ethylene glycol and propylene glycol; with hydrocarbons such as octane, pentane, heptane and hexane being preferable. The reaction is carried out within a temperature range of 0 to 180° C. and preferably 10 to 150° C.

The location of aromatic ring in a polymer chain does not affect the reaction. Not only pendant aromatic rings in polymers (e.g., polystyrene) but also polymers containing aromatic (and heteroaromatic) rings in polymer main chain (e.g., polysulfone) or side polymer chains (yet not pendant, as in graft polymers, graft copolymers, block polymers, block copolymers and the like can be functionalized using this new methodology (iridium-catalyzed C—H borylation of aromatic ring of polymers). For example, the iridium-catalyzed C—H bond borylation of commercial Udel® polysulfone (PSF of Scheme 3) with different molar ratios of $B_2pin_2$ to polymer repeating unit was performed in tetrahydrofuran (THF) solvent and provided the corresponding borylated polysulfone product (PSF-Bpin of Scheme 3). By changing the stoichiometry of $B_2pin_2$ relative to the polymer repeating unit, up to 186 mol % of attached Bpin group relative to the polymer repeating unit (i.e., 1.86 Bpin group per polysulfone repeating unit) of could be achieved.

Scheme 3. Iridium-catalyzed borylation of C—H bond of aromatic rings of polysulfone.

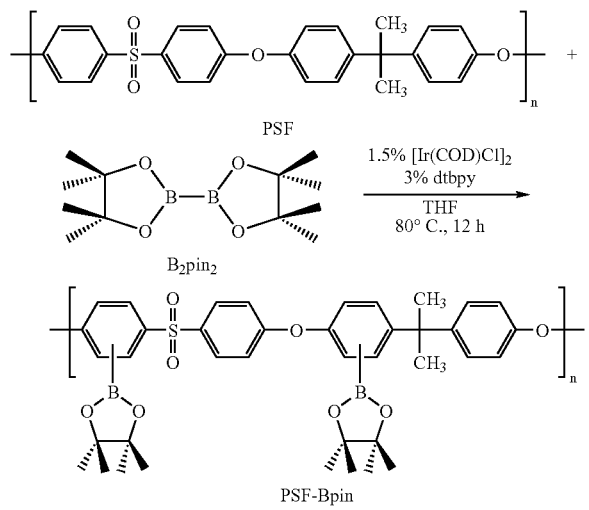

The technology described herein provides polymers that are useful in at least the same types of commercial products where related classes of polymers are presently used today. AS non-limiting examples of commercial uses, especially for the polystyrene classes of polymers are uses as: (a) Active filtration media in chromatographic systems, (b) Recoverable/recyclable polymer-metal catalyst systems, (c) Polymer supports, either as polymer reagents and polymer catalysts, in organic reactions, (d) Additives to polymer blends, (e) Membrane materials for fuel cells, biofuels production, and water purification, (and f) Precursor polymers that can be used for creation of various functionalized aromatic polymers.

What is claimed:

1. A method of modifying properties of a polymer comprising:
    providing a polymer in a solvent environment, the polymer having aromatic groups on a polymer chain;
    providing a boronic ester in the solvent environment; and
    catalytically attaching a boron-containing group derived from the boronic ester onto a carbon atom on at least some aromatic groups of the polymer chain.

2. The method of claim 1 wherein the boron-containing group on the carbon atom on at least some aromatic groups is selected from the group consisting of boronic ester, boronic acid or trifluoroboronate.

3. The method of claim 2 wherein the boron-containing group is subsequently reacted to form hydroxyl or phenoxy groups and boron removed from at least some links to the aromatic groups.

4. The method of claim 1 wherein the polymer comprises linkages derived from functionalized arene compounds.

5. The method of claim 1 wherein the polymer comprises linkages derived from styrene.

6. A method of modifying properties of a polymer comprising:
    providing a polymer in a solvent environment, the polymer having aromatic groups on a polymer chain; and
    catalytically attaching a boron-containing group on a carbon atom on at least some aromatic groups of the polymer chain
    wherein the boron-containing group is attached by catalyzed reaction of at least one pinacolborane or bis(pinacolato)diboron compound with at least one aromatic group on the polymer.

7. The method of claim 6 wherein the aromatic group is selected from the group comprising phenyl groups and naphthyl groups as main chain aromatic groups, side chain aromatic groups or pendant aromatic groups.

8. The method of claim 7 wherein the aromatic group is selected from the group consisting of pendant phenyl groups and pendant naphthyl groups.

9. A method of modifying properties of a polymer comprising:
    providing a polymer in a solvent environment, the polymer having aromatic groups on a polymer chain; and
    catalytically attaching a boron-containing group on a carbon atom on at least some aromatic groups of the polymer chain
    wherein the catalyst for attaching the boron group has a formula:

IrABn wherein Ir is an iridium cation, A is an anion and B is an alkene.

10. The method of claim 9 wherein the catalyst for attaching the boron group has a formula:

IrABn wherein Ir is an iridium cation, A is an anion and B is an alkene,
    wherein the polymer comprises linkages derived from functionalized arene compounds.

11. The method of claim 9 wherein the catalyst for attaching the boron group has a formula:

IrABn wherein Ir is an iridium cation, A is an anion and B is an alkene and a borane is used as a source of the boron groups, wherein the polymer comprises linkages derived from styrene.

12. The method of claim 10 wherein the aromatic groups of the polymer chain are selected from the group consisting of pendant aromatic groups, main chain aromatic groups and side chain aromatic groups.

13. A polymer having aromatic groups thereon, at least some of the aromatic groups having a boronic ester or boronic acid group bound to a carbon atom of the aromatic group, the boronic ester or boronic acid group containing a derivative of a boron compound having a formula:

$$IrAB_n$$

wherein Ir is an iridium cation, A is an anion and B is an alkene.

14. The method of claim 6 wherein the boronic ester has the formula:

$$(-B(OR))_2,$$

wherein R=alkyl.

15. The method of claim 4 wherein the arene group has a functional group selected from the group consisting of silane, siloxy, halide, hydroxy, amine, carbonyl, nitrile, sulfonyl, phosphine, alkyl, alkenyl, alkynyl, aryl, ethylenically unsaturated groups, acryloyl and epoxy.

* * * * *